United States Patent
Hoshi (10) Patent No.: US 9,812,722 B2
(45) Date of Patent: Nov. 7, 2017

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventor: Kiyoshi Hoshi, Land Baden-Württemberg (DE)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/784,767

(22) PCT Filed: Mar. 27, 2014

(86) PCT No.: PCT/JP2014/058953
§ 371 (c)(1),
(2) Date: Oct. 15, 2015

(87) PCT Pub. No.: WO2014/171291
PCT Pub. Date: Oct. 23, 2014

(65) Prior Publication Data
US 2016/0064754 A1 Mar. 3, 2016

(30) Foreign Application Priority Data
Apr. 16, 2013 (JP) ................. 2013-085941

(51) Int. Cl.
*H01M 8/04* (2016.01)
*H01M 16/00* (2006.01)
(Continued)

(52) U.S. Cl.
CPC ...... *H01M 8/04268* (2013.01); *H01M 8/0488* (2013.01); *H01M 8/0491* (2013.01); *H01M 8/0494* (2013.01); *H01M 8/04559* (2013.01); *H01M 8/04589* (2013.01); *H01M 8/04947* (2013.01); *H01M 16/006* (2013.01);
(Continued)

(58) Field of Classification Search
None
See application file for complete search history.

(56) References Cited

U.S. PATENT DOCUMENTS 8,092,947 B1 * 1/2012 Ishikawa ........... H01M 8/04268
429/431
2004/0009381 A1 1/2004 Sakai et al.
(Continued)

FOREIGN PATENT DOCUMENTS

JP 2000-357526 A 12/2000
JP 2004-152741 A 5/2004
(Continued)

*Primary Examiner* — Patrick Ryan
*Assistant Examiner* — Victoria Lynch
(74) *Attorney, Agent, or Firm* — Foley & Lardner LLP (57) ABSTRACT

A fuel cell system includes an auxiliary machine to be connected to a fuel cell, warm-up power control means for controlling generated power of the fuel cell by adjusting power supplied to the auxiliary machine during the warm-up of the fuel cell, and IV characteristic estimation means for temporarily reducing the power supplied to the auxiliary machine and estimating an IV characteristic of the fuel cell on the basis of at least two pairs of current values and voltage values at that time during the warm-up of the fuel cell.

9 Claims, 9 Drawing Sheets (51) Int. Cl.

| | | |
|---|---|---|
| *H01M 8/04223* | (2016.01) | |
| *H01M 8/04858* | (2016.01) | |
| *H01M 8/04828* | (2016.01) | |
| *H01M 8/04537* | (2016.01) | |
| *H01M 8/1018* | (2016.01) | |

(52) U.S. Cl.
CPC ..... *H01M 2008/1095* (2013.01); *H01M 2220/20* (2013.01); *H01M 2250/20* (2013.01); *Y02T 90/32* (2013.01)

(56) References Cited

U.S. PATENT DOCUMENTS

| | | |
|---|---|---|
| 2005/0053814 A1 | 3/2005 | Imamura et al. |
| 2008/0070070 A1 | 3/2008 | Sakai et al. |
| 2009/0186257 A1 | 7/2009 | Sakai et al. |
| 2010/0159342 A1* | 6/2010 | Imanishi ........... H01M 8/04089 429/444 |
| 2014/0205923 A1 | 7/2014 | Matsumoto |

FOREIGN PATENT DOCUMENTS

| | | |
|---|---|---|
| JP | 2007-035438 A | 2/2007 |
| JP | 2009-146743 A | 7/2009 |
| JP | 2011-222183 A | 11/2011 |
| WO | WO 2013/027634 A1 | 2/2013 |

* cited by examiner

FUEL CELL SYSTEM AND CONTROL METHOD FOR FUEL CELL SYSTEM

CROSS-REFERENCE TO RELATED APPLICATION

The present application claims a priority of Japanese Patent Application No. 2013-85941 filed with the Japan Patent Office on Apr. 16, 2013, and all the contents of which are hereby incorporated by reference.

TECHNICAL FIELD

The present invention relates to a fuel cell system and a control method for fuel cell system.

BACKGROUND ART

JP2000-357526A discloses a conventional fuel cell system in which a current-voltage characteristic of a fuel cell is estimated on the basis of an output voltage detected while an output current of the fuel cell is changed.

SUMMARY OF INVENTION

After the start-up of a fuel cell system, a fuel cell is warmed up by driving an auxiliary machine with generated power of the fuel cell and a vehicle travel permit is issued after an IV characteristic of the fuel cell reaches a desired IV characteristic. Thus, it is being studied to issue the vehicle travel permit as early as possible by estimating the IV characteristic during the warm-up of the fuel cell and issuing the vehicle travel permit when the estimated IV characteristic reaches the desired IV characteristic.

However, in order to ensure the estimation accuracy of the IV characteristic, the IV characteristic needs to be estimated on the basis of an output voltage when an output current of the fuel cell is changed with a specified current width or larger. Thus, if the output current of the fuel cell is suddenly increased by the current width to accurately estimate the IV characteristic during the warm-up in which power generation becomes unstable due to water or ice in the fuel cell, a voltage drop may occur due to a sudden current change.

On the other hand, if it is attempted to estimate the IV characteristic on the basis of the output voltage when the output current of the fuel cell is gradually increased to prevent such a voltage drop, the IV characteristic desired to be estimated may change during the rise of the output current and it may be impossible to ensure estimation accuracy since the IV characteristic changes from moment to moment during the warm-up of the fuel cell.

The present invention was developed in view of such a problem and aims to ensure the estimation accuracy of an IV characteristic while suppressing the occurrence of a voltage drop.

According to one aspect of the present invention, a fuel cell system for generating power by supplying anode gas and cathode gas to a fuel cell is provided. The fuel cell system also includes an auxiliary machine to be connected to the fuel cell, warm-up power control means for controlling generated power of the fuel cell by adjusting power supplied to the auxiliary machine during the warm-up of the fuel cell, and IV characteristic estimation means for temporarily reducing the power supplied to the auxiliary machine and estimating an IV characteristic of the fuel cell on the basis of at least two pairs of current values and voltage values at that time during the warm-up of the fuel cell.

DESCRIPTION OF EMBODIMENT

Hereinafter, each embodiment of the present invention is described with reference to the drawings and the like.

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

$$\text{Anode electrode: } 2H_2 \rightarrow 4H^+ + 4e^- \tag{1}$$

$$\text{Cathode electrode: } 4H^+ + 4e^- + O_2 \rightarrow 2H_2O \tag{2}$$

The fuel cell generates an electromotive force of about 1 volt by the above electrode reactions (1) and (2).

In the case of using a fuel cell as a power source for automotive vehicle, a fuel cell stack in which several hundreds of fuel cells are laminated is used since required power is large. By configuring a fuel cell system for supplying the anode gas and the cathode gas to the fuel cell stack, power for driving a vehicle is taken out.

Figure 1:
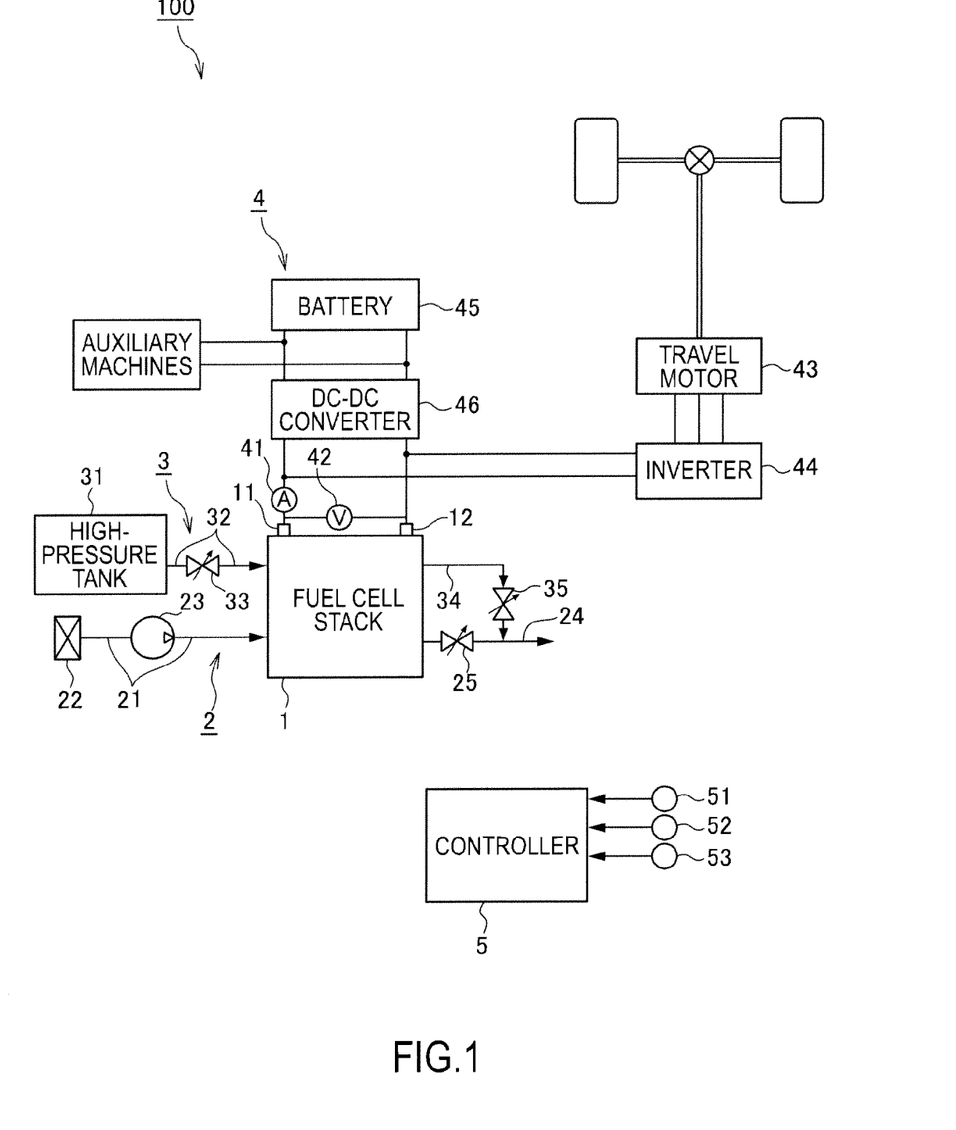
FIG. 1 is a schematic diagram of a fuel cell system according to one embodiment of the present invention.

FIG. 1 is a schematic diagram of a fuel cell system 100 according to one embodiment of the present invention.

The fuel cell system 100 includes a fuel cell stack 1, a cathode gas supplying/discharging device 2, an anode gas supplying/discharging device 3, a power system 4 and a controller 5.

The fuel cell stack 1 is formed by laminating several hundreds of fuel cells and generates power necessary to drive a vehicle upon receiving the supply of the anode gas and the cathode gas. The fuel cell stack 1 includes an anode electrode side output terminal 11 and a cathode electrode side output terminal 12 as terminals for taking out power.

The cathode gas supplying/discharging device 2 is a device for supplying the cathode gas to the fuel cell stack 1 and discharging cathode off-gas discharged from the fuel cell stack 1 to outside air. The cathode gas supplying/discharging device 2 includes a cathode gas supply passage 21, a filter 22, a cathode compressor 23, a cathode gas discharge passage 24 and a cathode pressure regulating valve 25.

The cathode gas supply passage 21 is a passage in which the cathode gas to be supplied to the fuel cell stack 1 flows. One end of the cathode gas supply passage 21 is connected to the filter 22 and the other end is connected to a cathode gas inlet hole of the fuel cell stack 1.

The filter 22 removes foreign substances in the cathode gas to be taken into the cathode gas supply passage 21.

The cathode compressor 23 is provided in the cathode gas supply passage 21. The cathode compressor 23 takes air (outside air) as the cathode gas into the cathode gas supply passage 21 via the filter 22 and supplies it to the fuel cell stack 1.

The cathode gas discharge passage 24 is a passage in which the cathode off-gas discharged from the fuel cell stack 1 flows. One end of the cathode gas discharge passage 24 is connected to a cathode gas outlet hole of the fuel cell stack 1 and the other end serves as an opening end.

The cathode pressure regulating valve 25 is provided in the cathode gas discharge passage 21. An opening of the cathode pressure regulating valve 25 is controlled to an arbitrary opening by the controller 5 to adjust a pressure of the cathode gas to be supplied to the fuel cell stack 1 to a desired pressure.

The anode gas supplying/discharging device 3 is a device for supplying the anode gas to the fuel cell stack 1 and discharging anode off-gas discharged from the fuel cell stack 1 to the cathode gas discharge passage 24. The anode gas supplying/discharging device 3 includes a high-pressure tank 31, an anode gas supply passage 32, a pressure regulating valve 33, an anode gas discharge passage 34 and a purge valve 35.

The high-pressure tank 31 stores the anode gas to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole of the fuel cell stack 1.

The pressure regulating valve 33 is provided in the anode gas supply passage 32. The pressure regulating valve 33 is on-off controlled by the controller 5 to adjust a pressure of the anode gas flowing out to the anode gas supply passage 32 from the high-pressure tank 31 to a desired pressure.

The anode gas discharge passage 34 is a passage in which the anode off-gas discharged from the fuel cell stack 1 flows. One end of the anode gas discharge passage 34 is connected to an anode gas outlet hole of the fuel cell stack 1 and the other end is connected to the cathode gas discharge passage 24.

The purge valve 35 is provided in the anode gas discharge passage 34. The purge valve 35 is on-off controlled by the controller 5 to adjust a flow rate of the anode off-gas discharged from the anode gas discharge passage 34 to the cathode gas discharge passage 24.

The power system 4 includes a current sensor 41, a voltage sensor 42, a travel motor 43, an inverter 44, a battery 45 and a DC/DC converter 46.

The current sensor 41 detects a current extracted from the fuel cell stack 1 (hereinafter, referred to as an "output current").

The voltage sensor 42 detects an inter-terminal voltage between the anode electrode side output terminal 11 and the cathode electrode side output terminal 12 (hereinafter, referred to as an "output voltage").

The travel motor 43 is a three-phase alternating-current synchronous motor in which a permanent magnet is embedded in a rotor and a stator coil is wound around a stator. The travel motor 43 has a function as a motor to be rotationally driven upon receiving the supply of power from the fuel cell stack 1 and the battery 45 and a function as a generator for generating electromotive forces on opposite ends of the stator coil during the deceleration of the vehicle in which the rotor is rotated by an external force.

The inverter 44 is composed of a plurality of semiconductor switches such as IGBTs (Insulated Gate Bipolar Transistors). The semiconductor switches of the inverter 44 are on-off controlled by the controller 5, thereby converting direct-current power into alternating-current power or alternating-current power into direct-current power. The inverter 44 converts composite direct-current power of generated power of the fuel cell stack 1 and output power of the battery 45 into three-phase alternating-current power and supplies it to the travel motor 43 when the travel motor 43 functions as the motor. On the other hand, the inverter 44 converts regenerative power (three-phase alternating-current power) of the travel motor 43 into direct-current power and supplies it to the battery 45 when the travel motor 43 functions as the generator.

The battery 45 is charged with a surplus of the generated power (output current×output voltage) of the fuel cell stack 1 and the regenerative power of the travel motor 43. The power charged into the battery 45 is supplied to auxiliary machines such as the cathode compressor 23 and the travel motor 43 if necessary.

The DC/DC converter 46 is a bidirectional voltage converter for increasing and decreasing the output voltage of the fuel cell stack 1. By controlling the output voltage of the fuel cell stack 1 by the DC/DC converter 46, the output current of the fuel cell stack and, consequently, the generated power are controlled.

The controller 5 is configured by a microcomputer including a central processing unit (CPU), a read-only memory (ROM), a random access memory (RAM) and an input/output interface (I/O interface). Signals from various sensors necessary to control the fuel cell system 100 are input to the controller 5. The sensors include an accelerator stroke sensor 51 for detecting a depressed amount of an accelerator pedal (hereinafter, referred to as an "accelerator operation amount"), an SOC sensor 52 for detecting a charged amount of the battery 45, a battery temperature sensor 53 for detecting a temperature of the battery 45 besides the current sensor 41 and the voltage sensor 42 described above.

Figure 2:
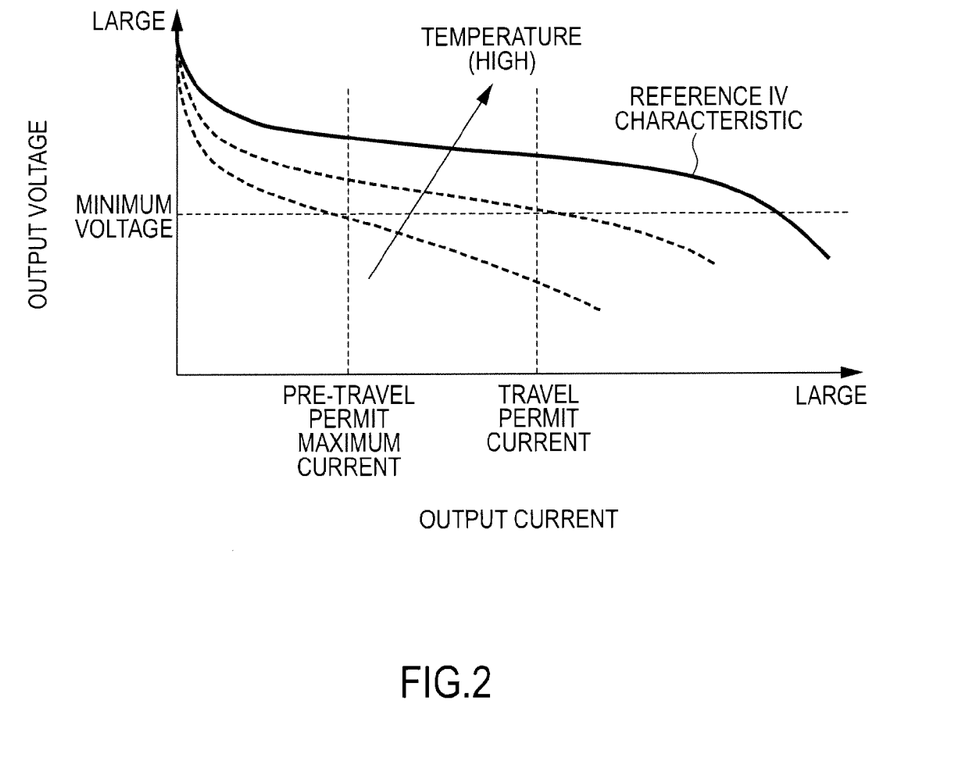
FIG. 2 is a graph showing a relationship between the temperature of a fuel cell stack and a current-voltage characteristic of the fuel cell stack.

FIG. 2 is a graph showing a relationship between the temperature of the fuel cell stack 1 and a current-voltage characteristic (hereinafter, referred to as an "IV characteristic") of the fuel cell stack 1. In FIG. 2, an IV characteristic shown by solid line is an IV characteristic after the warm-up of the fuel cell stack 1 is completed (hereinafter, referred to as a "reference IV characteristic").

As shown in FIG. 2, the IV characteristic of the fuel cell stack 1 changes according to the temperature of the fuel cell stack 1 and the output voltage when the output current of the same value is extracted from fuel cells becomes lower as the temperature of the fuel cell stack 1 decreases. Specifically, the power generation efficiency of the fuel cell stack 1 decreases as the temperature of the fuel cell stack 1 decreases.

If the travel of the vehicle is permitted in a state where the power generation efficiency of the fuel cell stack 1 is low, power required by the travel motor 43 during travel increases and the output voltage of the fuel cell stack 1 may fall below a minimum voltage when the output current of the fuel cell stack 1 increases. Here, the minimum voltage is a voltage value which is set by an experiment or the like in advance and at which the travel motor 43 cannot be driven if the output voltage of the fuel cell stack 1 falls below the minimum voltage.

Accordingly, after the start-up of the fuel cell system 100, a vehicle travel permit needs to be issued after confirming that the IV characteristic changing from moment to moment according to a temperature increase of the fuel cell stack 1 by a warm-up of the fuel cell stack 1 has reached an IV characteristic at which the output voltage of the fuel cell stack 1 does not fall below the minimum voltage even if the travel motor 43 is driven. In FIG. 2, the vehicle travel permit needs to be issued after confirming that the IV characteristic has been reached an IV characteristic. In this IV characteristic, the output voltage at which the output current of the fuel cell stack 1 reaches a travel permit current does not fall below the minimum voltage. The travel permit current is a value obtained by adding a predetermined margin to a minimum value of the output current supposed when the vehicle is caused to start or travel by driving the travel motor 43 and set by an experiment or the like in advance.

However, electrical components energizable during warm-up in which no travel permit is issued are limited to the auxiliary machines other than the travel motor 43 such as the cathode compressor 23 and a heater for heating cooling water for cooling the fuel cell stack 1 and the battery 45. That is, an output current not less than a current which can be caused to flow into the auxiliary machines and the battery 45 cannot be extracted from the fuel cell stack 1 during warm-up in which no travel permit is issued.

Accordingly, a maximum value of the output current during warm-up in which no travel permit is issued (hereinafter, referred to as a "pre-travel permit maximum current") is the sum of a current which can be caused to flow into the auxiliary machines (hereinafter, referred to as an "auxiliary machine consumption current") and a current which can be caused to flow into the battery 45 (hereinafter, referred to as a "charge current"). This pre-travel permit maximum current is a value smaller than the travel permit current.

Thus, since the travel permit current cannot be extracted from the fuel cell stack 1 during warm-up in which no travel permit is issued, it is not possible to actually determine whether or not the output voltage when the travel permit current is extracted from the fuel cell stack 1 is below the minimum voltage.

Accordingly, in the present embodiment, after the start-up of the fuel cell system 100, the IV characteristic of the fuel cell stack 1 is estimated while the fuel cell stack 1 is warmed up and the vehicle travel permit is issued when the estimated IV characteristic reaches the IV characteristic at which the output voltage of the fuel cell stack 1 does not fall below the minimum voltage even if the travel motor 43 is driven.

Figure 3:
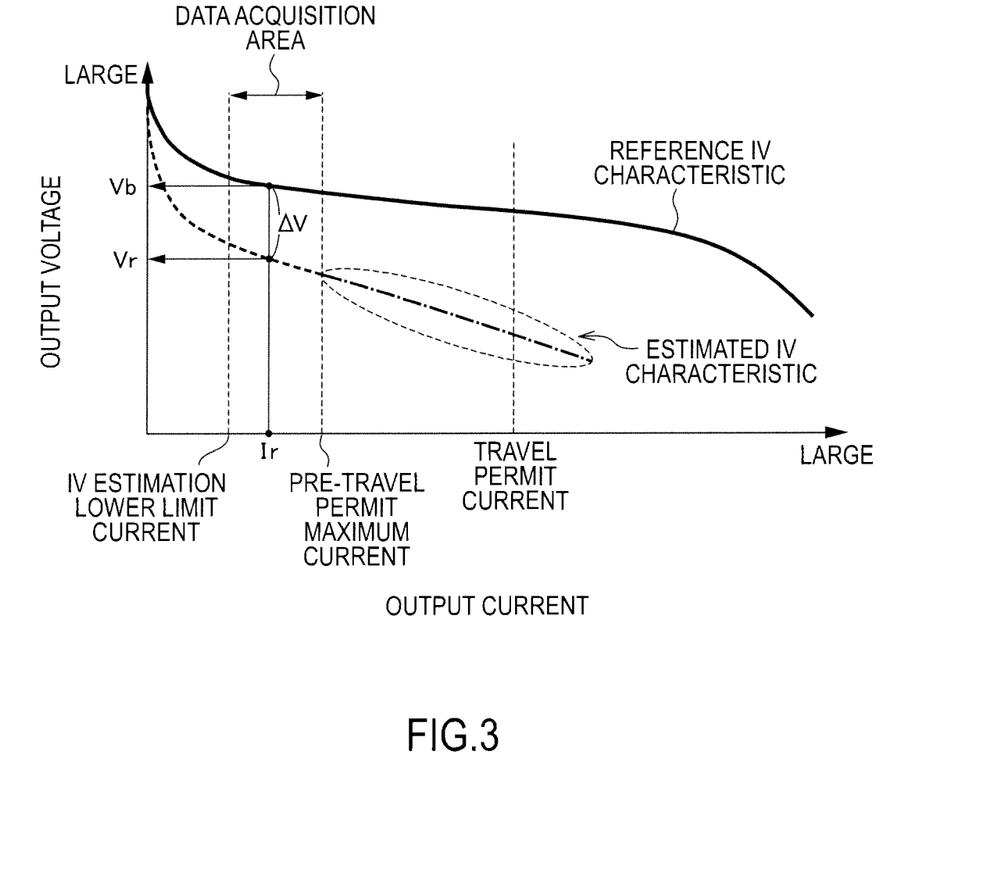
FIG. 3 is a graph showing a method for estimating the IV characteristic of the fuel cell stack during the start-up of the fuel cell system.

FIG. 3 is a graph showing a method for estimating the IV characteristic of the fuel cell stack 1 during the start-up of the fuel cell system 100. In FIG. 3 a solid line represents a reference IV characteristic. A broken line represents an actual IV characteristic at a certain point during warm-up in which no travel permit is issued (hereinafter, referred to as an "actual IV characteristic").

During warm-up in which no travel permit is issued, the output current can be increased only to the pre-travel permit maximum current. Thus, the actual IV characteristic in an area not less than the pre-travel permit maximum current cannot be actually detected.

Here, it is empirically proven that a voltage difference $\Delta V$ between a voltage $Vb$ on the reference IV characteristic (hereinafter, referred to as a "reference voltage") and a voltage $Vr$ on the actual IV characteristic (i.e. actual output voltage detected by the voltage sensor) is a linear function of monotonously increasing as an output current I increases, as shown in the following equation (3).

$$\Delta V = A \times I + B \quad (3)$$

Accordingly, if the voltage difference $\Delta V$ is obtained from the reference voltages $Vb$ and the actual output voltages $Vr$ corresponding to at least arbitrary two actual output currents $Ir$ by varying the output current until the pre-travel permit maximum current, a gradient A and an intercept B of equation (3) can be calculated. If the gradient A and the intercept B of equation (3) can be calculated, the voltage difference $\Delta V$ at an arbitrary output current in the area not less than the pre-travel permit maximum current can be calculated. Thus, the actual IV characteristic in the area not less than the pre-travel permit maximum current can be drawn as shown by dashed-dotted line in FIG. 3 by subtracting the voltage difference $\Delta V$ from the reference voltage $Vb$.

Note that since a voltage drop due to activation polarization is large and a variation of the output voltage in response to a variation of the output current is relatively large until the output current reaches an IV estimation lower limit current as shown in FIG. 3, approximation accuracy is reduced. Thus, in this embodiment, by varying the output current with a specified variation width or larger from the IV estimation lower limit current to the pre-travel permit maximum current (hereinafter, referred to as a "data acquisition area"), data on reference voltages and actual output voltages corresponding to output current values at least at two or more points in the data acquisition area is acquired, and the gradient A and the intercept B of equation (3) are sequentially calculated by a minimum square method.

Here, there are considered a method for acquiring data while increasing the output current and a method for acquiring data while reducing the output current in the case of acquiring data on the reference voltages and the actual output voltages at that time by varying the output current in the data acquisition area. In this embodiment, data is acquired while reducing the output current for the following reason.

Figure 4:
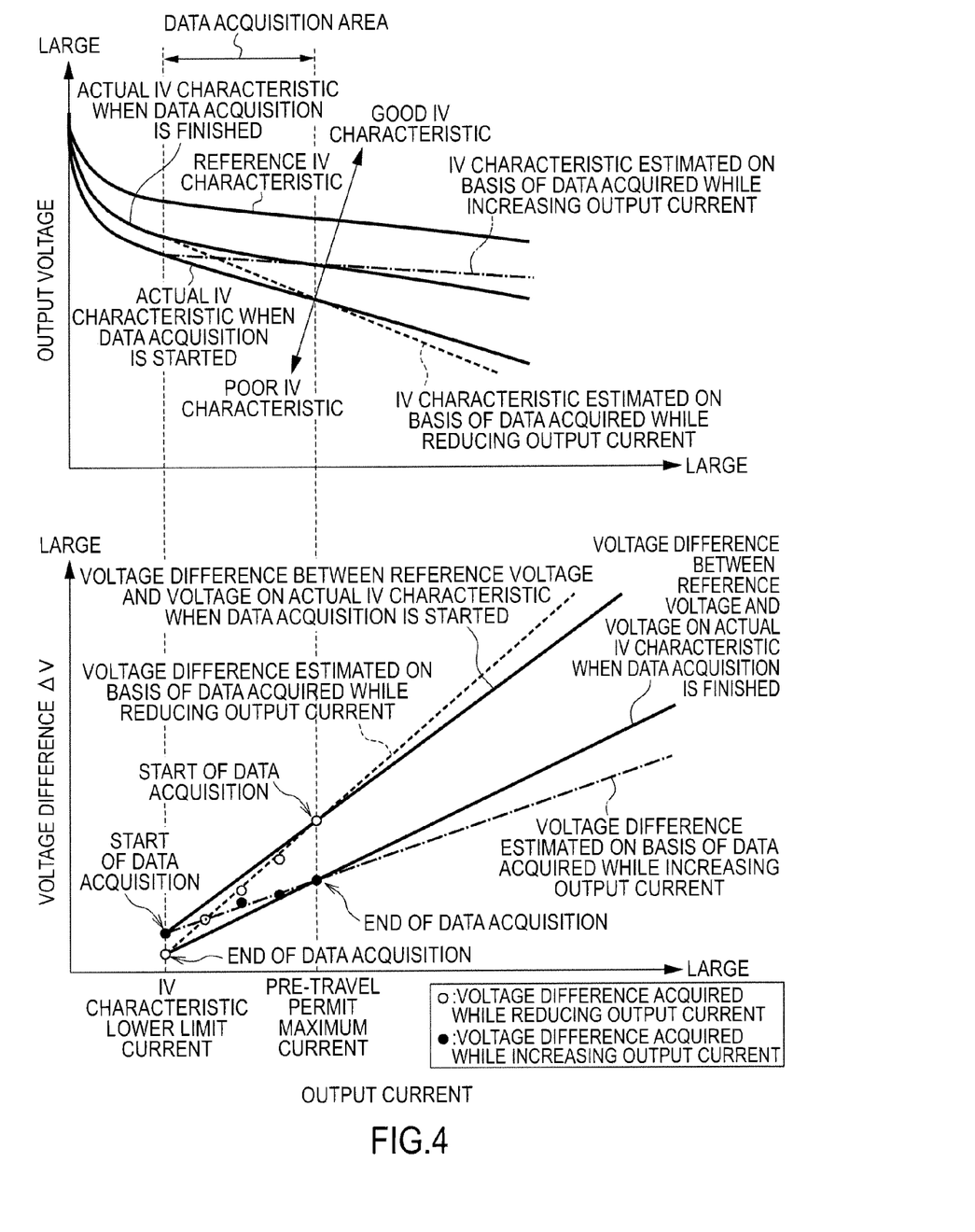
FIG. 4 shows graphs showing a reason for obtaining data while reducing an output current.

FIG. 4 shows graphs showing a reason for acquiring data while reducing the output current. (A) in FIG. 4 is a graph showing a transition of an actual IV characteristic of the fuel cell stack 1 during the start-up of the fuel cell system 100, an IV characteristic (dashed-dotted line) estimated on the basis of data acquired while increasing the output current and an IV characteristic (broken line) estimated on the basis of data acquired while reducing the output current. (B) in FIG. 4 is a graph showing voltage differences among the reference IV characteristic, the actual IV characteristic and the estimated IV characteristic according to the output current.

During the warm-up of the fuel cell stack 1, the IV characteristic is gradually recovered toward the reference IV characteristic also while the data is acquired by varying the output current with the specified variation width or larger. Thus, if the actual IV characteristic when data acquisition is started and the actual IV characteristic when the data acquisition is finished are compared as shown in (A) of FIG. 4, the IV characteristic when the data acquisition is finished is a better IV characteristic than the IV characteristic when the data acquisition is started.

Then, if the gradient A and the intercept B of equation (3) are calculated on the basis of the data (reference voltage and actual output voltage) acquired at an arbitrary output current value while increasing the output current within the data acquisition area as shown by dashed-dotted line in (B) of FIG. 4, the calculated gradient A becomes smaller than the gradient of the linear function of the voltage difference $\Delta V$ between the reference voltage and the voltage on the actual IV characteristic when the data acquisition is finished.

Thus, the IV characteristic estimated on the basis of the data acquired while increasing the output current within the data acquisition area becomes a better IV characteristic than the actual IV characteristic when the data acquisition is finished as shown by dashed-dotted line in (A) of FIG. 4. If the travel permit is issued on the basis of the better IV characteristic than the actual IV characteristic, the output voltage may fall below the minimum voltage necessary to drive a motor for vehicle travel when the output current increases due to vehicle travel.

Contrary to this, if the gradient A and the intercept B of equation (3) are calculated on the basis of the data acquired at an arbitrary output current value while reducing the output current within the data acquisition area as shown by broken line in (B) of FIG. 4, the calculated gradient A becomes larger than the gradient of the linear function of the voltage difference $\Delta V$ between the reference voltage and the voltage on the actual IV characteristic when the data acquisition is finished.

Thus, the IV characteristic estimated on the basis of the data acquired while reducing the output current within the data acquisition area becomes a worse IV characteristic than the actual IV characteristic when the data acquisition is finished as shown by dashed line in (B) of FIG. 4. If the travel permit is issued on the basis of the worse IV characteristic than the actual IV characteristic, there is no possibility that the output voltage falls below the minimum voltage even if the output current increases due to vehicle travel.

Further, in order to ensure the estimation accuracy of an IV characteristic, the IV characteristic needs to be estimated on the basis of data when an output current of a fuel cell is changed with a specified current width or larger. Thus, if the output current of the fuel cell is suddenly increased by a predetermined current width to accurately estimate the IV characteristic during warm-up in which power generation becomes unstable due to water or ice in the fuel cell, a voltage drop may occur due to such a sudden current change.

On the other hand, if it is attempted to estimate the IV characteristic on the basis of the output voltage when the output current of the fuel cell is gradually increased in order to prevent such a voltage drop, the IV characteristic desired to be estimated may change during the rise of the output current and it may be impossible to ensure estimation accuracy since the IV characteristic changes from moment to moment during the warm-up of the fuel cell.

Contrary to this, if the IV characteristic is estimated on the basis of the data acquired while reducing the output current within the data acquisition area, water and ice in a fuel cell stack are not increased by power generation as when the output current is increased. Thus, the occurrence of a voltage drop due to this can be suppressed.

Since there is no concern about the occurrence of a voltage drop, the output current can be changed at a faster rate than in the case of increasing the output current. Thus, a change of the IV characteristic while data necessary for the IV characteristic is acquired can be small, wherefore the estimation accuracy of the IV characteristic can be ensured.

Thus, in the present embodiment, the IV characteristic is estimated on the basis of the data acquired while reducing the output current.

To estimate the IV characteristic during warm-up in which no travel permit is issued in this way, the output current needs to be controlled to a target output current for IV characteristic estimation to reduce the output current with the specified variation width or larger from the IV estimation lower limit current to the pre-travel permit maximum current.

Figure 5:
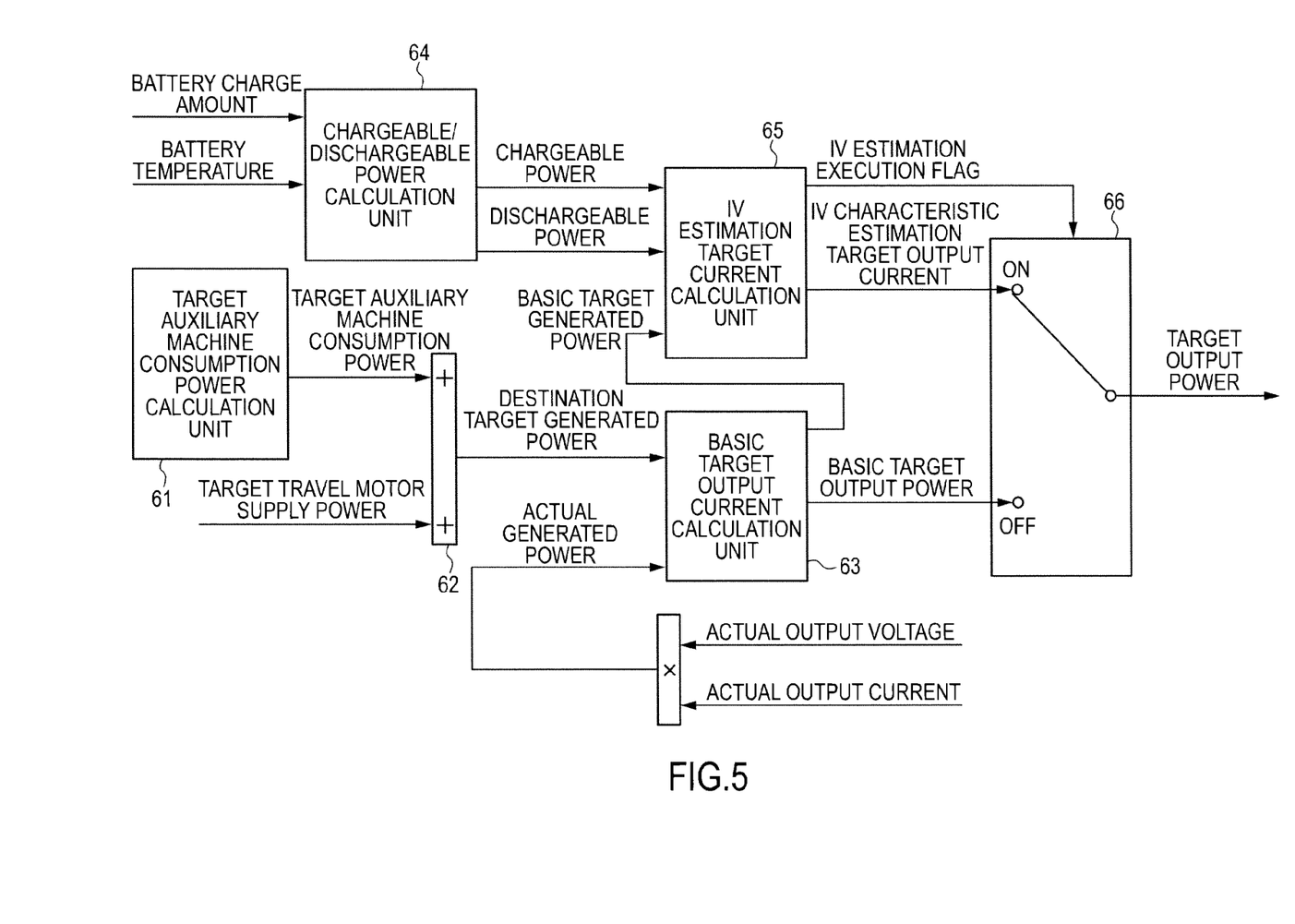
FIG. 5 is a control block diagram for setting a target output current according to one embodiment of the present invention.

FIG. 5 is a control block diagram for setting the target output current according to the present embodiment.

A target auxiliary machine consumption power calculation unit 61 calculates a target value of power to be consumed by each auxiliary machine such as the cathode compressor 23 (hereinafter, referred to as "target auxiliary machine consumption power"). During warm-up in which no travel permit is issued, the target auxiliary machine consumption power is set at predetermined warm-up target consumption power. In this embodiment, the warm-up target consumption power is set at power when the consumption power of each auxiliary machine is maximized.

The target auxiliary machine consumption power and target travel motor supply power are input to a destination target generated power calculation unit 62. The destination target generated power calculation unit 62 calculates the sum of the target auxiliary machine consumption power and the target travel motor supply power as destination target generated power. The target travel motor supply power increases as the accelerator operation amount increases and is zero regardless of the accelerator operation amount during warm-up in which no travel permit is issued.

The destination target generated power and actual generated power (actual output voltage×actual output current) are input to a basic target output current calculation unit 63. The basic target output current calculation unit 63 calculates a target value of the generated power when the actual generated power is changed toward the destination target generated power as basic target generated power on the basis of a deviation between the destination target generated power and the actual generated power. Further, the basic target output current calculation unit 63 calculates a target value of the output current required to make the generated power the basic target generated power as a basic target output current.

A battery charge amount and a battery temperature are input to a chargeable/dischargeable power calculation unit 64. The chargeable/dischargeable power calculation unit 64 calculates power chargeable into the battery 45 (hereinafter, referred to as "chargeable power") and power extractable from the battery 45 (hereinafter, referred to as "dischargeable power") on the basis of the battery charge amount and the battery temperature.

The basic target generated power, the chargeable power and the dischargeable power are input to an IV estimation target current calculation unit 65. The IV estimation target current calculation unit 65 calculates a target value of the output current when the IV characteristic is estimated (hereinafter, referred to as an "IV estimation target current") on the basis of these input values and outputs an ON/OFF signal of an IV estimation execution flag. When the fuel cell system is started up, the IV estimation execution flag is set to OFF.

The detailed contents of the IV estimation target current calculation unit 65 are described later with reference to FIGS. 6 to 9.

The IV estimation target current and the basic target output current are input to a target output current calculation unit 66. The target output current calculation unit 66 calculates the IV estimation target current as a target output current if the IV estimation execution flag is ON. On the other hand, the target output current calculation unit 66 calculates the basic target output current as the target output current if the IV estimation execution flag is OFF.

Figure 6:
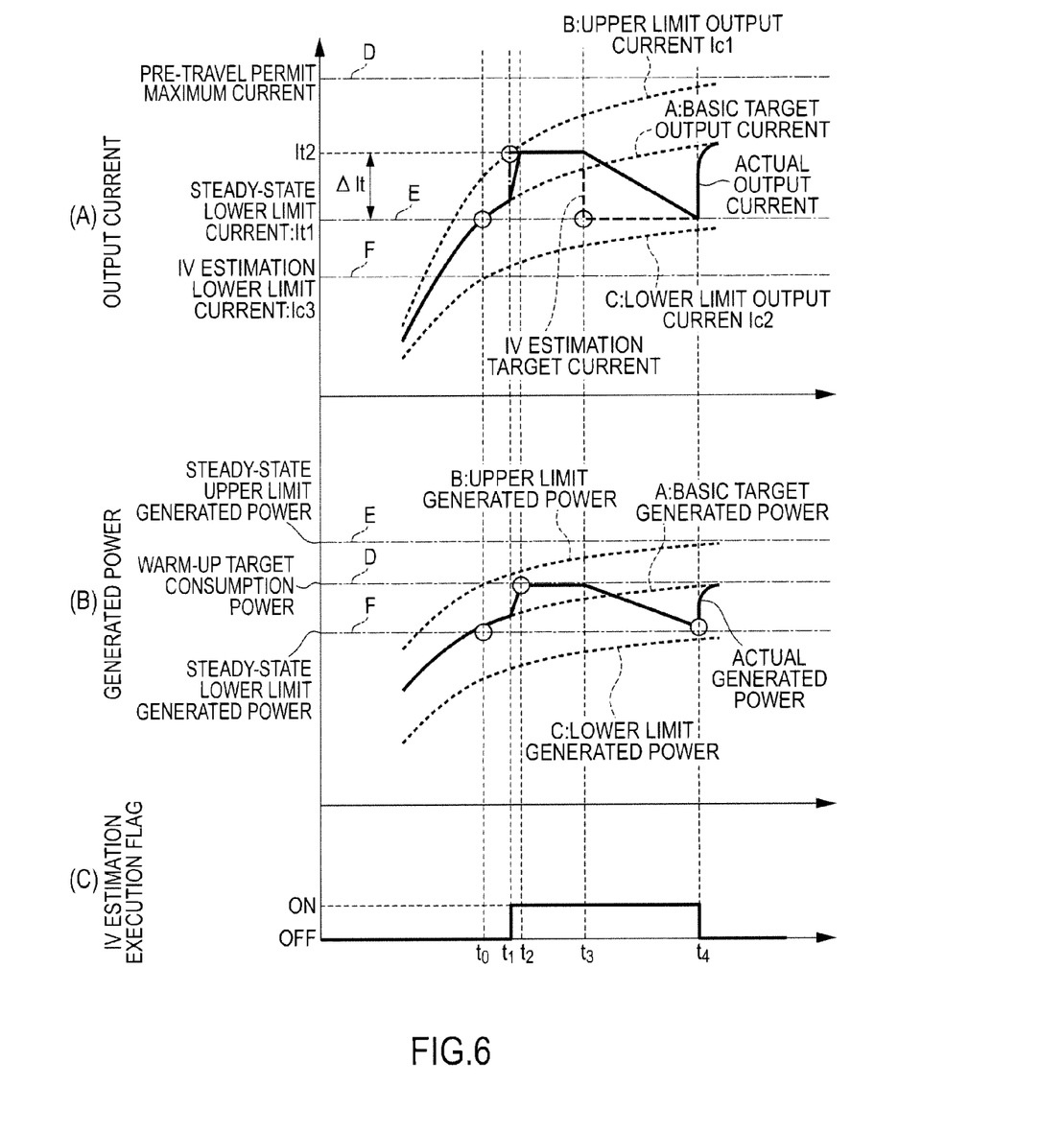
FIG. 6 is a time chart showing changes of the output current and generated power controlled by the control block diagram of FIG. 5.

FIG. 6 is a time chart showing changes of the output current and the generated power controlled by the control block diagram of FIG. 5.

In FIG. 6(B), a broken line A represents the basic target generated power. A broken line B represents power obtained by adding the chargeable power to the basic target generated power (hereinafter, referred to as "upper limit generated power"). A broken line C represents power obtained by subtracting the dischargeable power from the basic target generated power (hereinafter, referred to as "lower limit generated power").

Note that a dashed-dotted line D represents the destination target generated power during warm-up in which no travel permit is issued after the start-up of the fuel cell system, i.e. the warm-up target consumption power. A dashed-dotted line E represents power obtained by adding the chargeable power to the destination target generated power and represents the upper limit generated power after the auxiliary machine consumption power increases to the destination target generated power (hereinafter, referred to as "steady-state upper limit generated power). A dashed-dotted line F represents power obtained by subtracting the dischargeable power from the destination target generated power and represents the lower limit generated power after the auxiliary machine consumption power increases to the destination target generated power (hereinafter, referred to as "steady-state lower limit generated power).

In FIG. 6(A), a broken line A represents the basic target output current. A broken line B represents an output current $I_{c1}$ required to make the generated power the upper limit generated power (hereinafter, referred to as "upper limit output current"). A broken line C represents an output current $I_{c2}$ required to make the generated power the lower limit generated power (hereinafter, referred to as "lower limit output current"). The output current can be varied from the lower limit output current $I_{c2}$ to the upper limit output current $I_{c1}$ during warm-up in which no travel permit is issued.

Note that a dashed-dotted line D represents an output current required to make the generated power the steady-state upper limit generated power, i.e. the pre-travel permit maximum current. A dashed-dotted line E represents an output current $I_{t1}$ required to make the generated power the steady-state lower limit generated power (hereinafter, referred to as "steady-state lower limit output current). A dashed-dotted line F represents an IV estimation lower limit current $I_{c3}$.

When the fuel cell system 100 is started up, the warm-up target consumption power is set as the destination target output power and a target value for making the generated power the warm-up target consumption power is set as the basic target generated power as shown in FIG. 6(B).

As a result, the basic target output current is set as the target output current and the output current is controlled to the basic target output current as shown in FIG. 6(A) since the IV estimation execution flag is set at OFF when the fuel cell system 100 is started up.

At time t0, the output current of the fuel cell stack 1 reaches the steady-state lower limit current $I_{t1}$. When a difference between the upper limit output current $I_{c1}$ and the steady-state lower limit current $I_{t1}$ becomes equal to or larger than a predetermined current variation width $\Delta I_t$ necessary to ensure predetermined accuracy when the IV characteristic is estimated at time t1, the IV estimation execution flag is set to ON. Then, the upper limit output current $I_{t2}$ at time t1 (hereinafter, referred to as a "load increasing target current") is set as the IV estimation target current.

As a result, the IV estimation target current is set as the target output current and the output current is controlled to reach the load increasing target current $I_{t2}$ as shown in FIG. 6(A).

When the output current reaches the load increasing target current $I_{t2}$ at time t2, the output current is maintained at the load increasing target current $I_{t2}$ until the elapse of a predetermined time from that point of time.

When the elapsed time from time t2 reaches the predetermined time at time t3, the steady-state lower-limit current $I_{t1}$ is set as the IV estimation target current and the output current is changed to the steady-state lower-limit current $I_{t1}$ at a predetermined change rate. While the output current is changed to the steady-state lower-limit current $I_{t1}$ at the predetermined change rate, a plurality of pieces of data on the reference voltages and the actual output voltages corresponding to arbitrary output current values are acquired.

When the output current decreases to the steady-state lower limit current $I_{t1}$ at time t4, the IV characteristic is estimated on the basis of acquired parameters. Then, the IV estimation execution flag is set to OFF and the output current is controlled to reach the basic target output current again.

Figure 7:
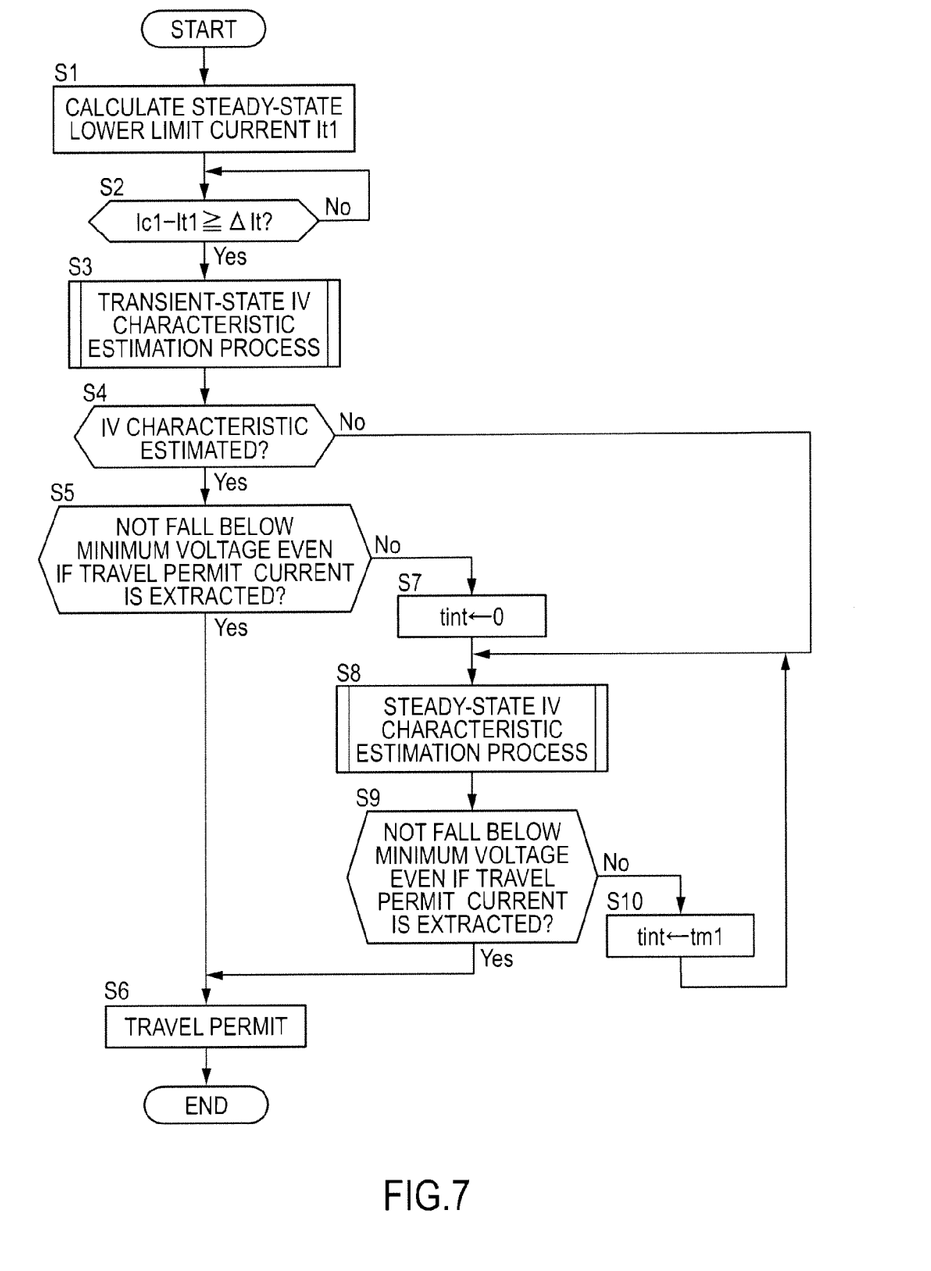
FIG. 7 is a flow chart showing an IV characteristic estimation control according to one embodiment of the present invention.

FIG. 7 is a flow chart showing an IV characteristic estimation control according to the present embodiment.

In Step S1, the controller 5 calculates the steady-state lower limit current $I_{t1}$. Specifically, the steady-state lower limit generated power is calculated by subtracting the dischargeable power from the destination target generated power during warm-up in which no travel permit is issued (warm-up target consumption power). Then, the output current required to make the generated power the steady-state lower limit generated power is calculated as the steady-state lower limit current $I_{t1}$.

In Step S2, the controller 5 determines whether or not the difference between the upper limit output current $I_d$ and the steady-state lower limit current $I_{t1}$ has become equal to or larger than the current variation width $\Delta I_t$ necessary to ensure predetermined accuracy when the IV characteristic is estimated. The controller 5 repeats this processing until the difference between the upper limit output current $L_{c1}$ and the steady-state lower limit current $I_{t1}$ becomes equal to or larger than the current variation width $\Delta I_t$ and performs a processing of Step S3 if the difference between the upper limit output current $I_{c1}$ and the steady-state lower limit current $I_{t1}$ becomes equal to or larger than the current variation width $\Delta I_t$.

In Step S3, the controller 5 performs a transient-state IV characteristic estimation process. The transient-state IV characteristic estimation process is the first IV characteristic estimation process performed after the fuel cell system 100 is started up and an IV characteristic estimation process performed in a transient state before the auxiliary machine consumption power reaches the warm-up target consumption power. The details of the transient-state IV characteristic estimation process are described later with reference to FIG. 8.

In Step S4, the controller 5 determines whether or not the IV characteristic has been estimated in the transient-state IV characteristic estimation process. The controller 5 performs a processing of Step S5 if the IV characteristic has been estimated while performing a processing of Step S8 unless otherwise.

In Step S5, the controller 5 determines on the basis of the IV characteristic estimated in the transient-state IV characteristic estimation process whether or not the output voltage when the travel permit current was extracted from the fuel cell stack 1 is below the minimum voltage. The controller 5 performs a processing of Step S6 unless the output voltage when the travel permit current was extracted from the fuel cell stack 1 is below the minimum voltage. On the other hand, the controller 5 performs a processing of Step S7 if the output voltage when the travel permit current was extracted from the fuel cell stack 1 is below the minimum voltage.

In Step S6, the controller 5 issues the vehicle travel permit.

In Step S7, the controller 5 sets an interval period $T_{int}$ until a steady-state IV characteristic estimation process to be described later is performed after the transient-state IV characteristic estimation process is performed to zero.

In Step S8, the controller 5 performs the steady-state IV characteristic estimation process. The steady-state IV characteristic estimation process is the second or subsequent IV characteristic estimation process performed after the transient-state IV characteristic estimation process is performed and basically an IV characteristic estimation process performed in a steady state after the auxiliary machine consumption power reaches the warm-up target consumption power. The details of the steady-state IV characteristic estimation process are described later with reference to FIG. 9.

In Step S9, the controller 5 determines on the basis of the IV characteristic estimated in the steady-state IV characteristic estimation process whether or not the output voltage when the travel permit current was extracted from the fuel cell stack 1 is below the minimum voltage. The controller 5 performs the processing of Step S6 unless the output voltage when the travel permit current was extracted from the fuel cell stack 1 is below the minimum voltage. On the other hand, the controller 5 performs a processing of Step S10 if the output voltage when the travel permit current was extracted from the fuel cell stack 1 is below the minimum voltage.

In Step S10, the controller 5 sets the interval period $t_{int}$ to a variable value $T_{m1}$. The variable value $t_{m1}$ is set to be shorter as the IV characteristic estimated in the steady-state IV characteristic estimation process approximates to the reference IV characteristic, i.e. as the IV characteristic is recovered.

Figure 8:
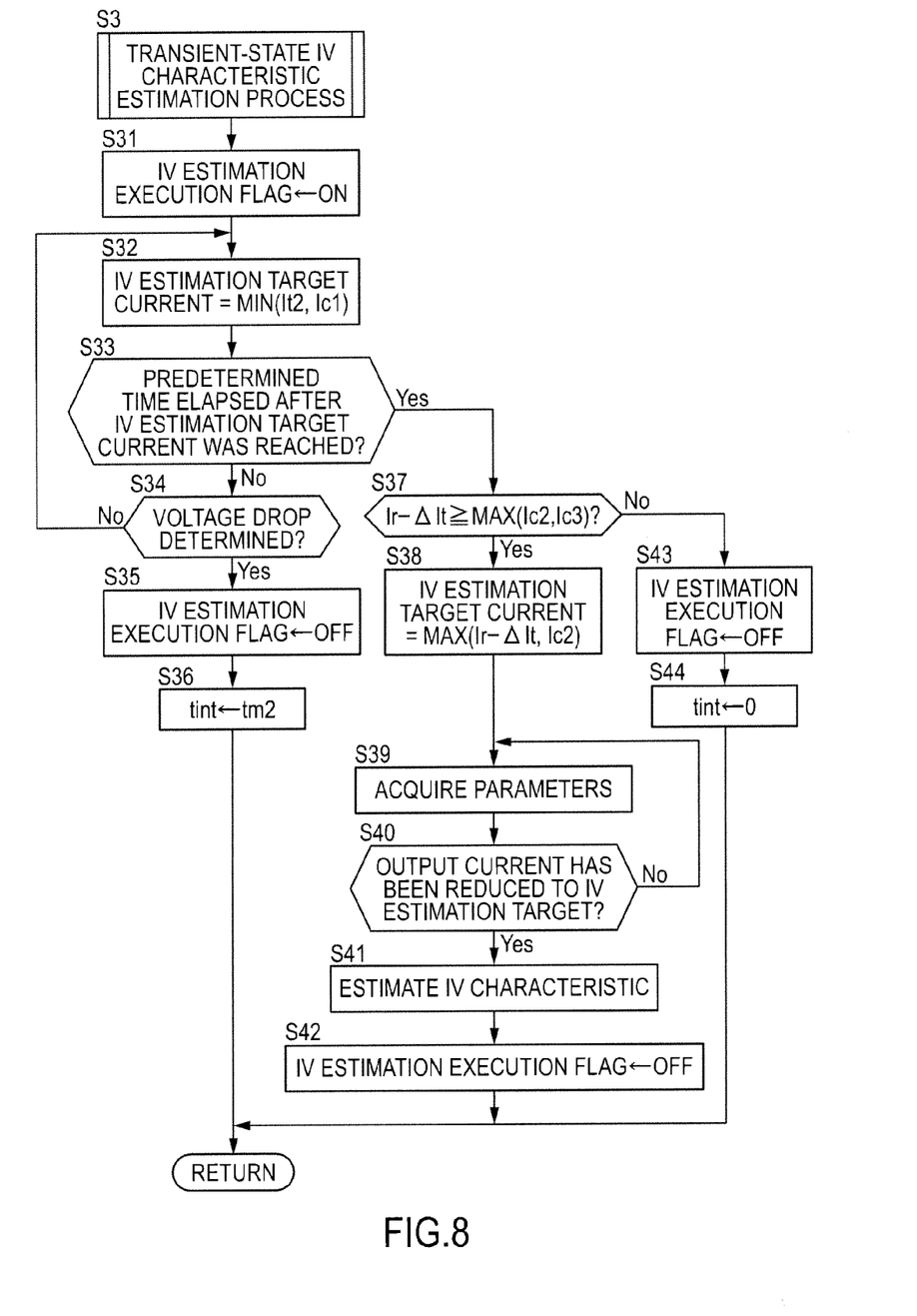
FIG. 8 is a flow chart showing a transient-state IV characteristic estimation process.

FIG. 8 is a flow chart showing the transient-state IV characteristic estimation process.

In Step S31, the controller 5 sets the IV estimation execution flag to ON.

In Step S32, the controller 5 sets the smaller one of the upper limit output current $I_{t2}$ when the difference between the upper limit output current $I_{c1}$ and the steady-state lower limit current $I_{t1}$ becomes equal to or larger than the predetermined current variation width $\Delta I_t$ (hereinafter, referred to as the "load increasing target current") and the present upper limit output current $I_{c1}$ as the IV estimation target current. The load increasing target current $I_{t2}$ is basically set as the IV estimation target current in this Step. The smaller one of the load increasing target current $I_{t2}$ and the present upper limit output current $I_{c1}$ is set as the IV estimation target current for the following reason. Specifically, if the load increasing target current $I_{t2}$ irregularly becomes larger than the present upper limit output current $I_{c1}$ when the output current is maintained at the IV estimation target current in Step S33 to be described later, a charge current becomes excessive and the battery 45 is deteriorated. To prevent this, the above setting is made.

In Step S33, the controller 5 determines whether or not a predetermined time has elapsed after the output current reached the IV estimation target current set in Step S32. The controller 5 performs a processing of Step S34 unless the predetermined time has elapsed after the output current reached the IV estimation target current while preforming a processing Step S37 if the predetermined time has elapsed.

In Step S34, the controller 5 performs a voltage drop determination. Specifically, whether or not the output voltage has dropped by a predetermined voltage to be below a voltage drop determination value is determined when the output current is maintained at the IV estimation target current. The controller 5 performs a processing of Step S35 to stop the transient-state IV characteristic estimation process if the output voltage is below the predetermined voltage drop determination value. On the other hand, a return is made to the processing of Step S32 unless the output voltage is below the predetermined voltage drop determination value.

In Step S35, the controller 5 stops the transient-state IV characteristic estimation process by setting the IV estimation execution flag to OFF. Then, the basic target output current is set as the target output current and the output current is controlled to the basic target output current.

In Step S36, the controller 5 sets the interval period $t_{int}$ to a predetermined fixed value $t_{m2}$. The fixed value $t_{m2}$ is a value larger than the variable value $t_{m1}$.

In Step S37, the controller 5 determines whether or not a value obtained by subtracting the current variation width $\Delta I_t$ from the present output current $I_r$ (=IV estimation target current set in Step S32) is not smaller than the lower limit output current $I_{c2}$ and the IV estimation lower limit current $I_{c3}$. The controller 5 performs a processing of Step S38 if the value obtained by subtracting the current variation width $\Delta I_t$ from the present output current $I_r$ is not smaller than the lower limit output current $I_{c2}$ and the IV estimation lower limit current $I_{c3}$. On the other hand, a processing of Step S43 is performed to stop the transient-state IV characteristic estimation process if the value obtained by subtracting the current variation width $\Delta I_t$ from the present output current $I_r$ is smaller than the lower limit output current $I_{c2}$ and the IV estimation lower limit current $I_{c3}$.

In Step S38, the controller 5 sets the larger one of the value obtained by subtracting the current variation width $\Delta I_t$ from the present output current $I_r$ and the lower limit output current $I_{c2}$ as the IV estimation target current and reduces the output current toward the IV estimation target current at a predetermined change rate.

In Step S39, the controller 5 acquires data on the reference voltages and the actual output voltages while the output current is reduced.

In Step S40, the controller 5 determines whether or not the output current has been reduced to the IV estimation target current set in Step S38. The controller 5 performs a processing of Step S41 if the output current has been reduced to the IV estimation target current while returning to the processing of Step S39 to acquire the above three parameters unless otherwise.

In Step S41, the controller 5 finishes the acquisition of the data on the reference voltages and the actual output voltages and estimates the IV characteristic on the basis of the acquired data.

In Step S42, the controller 5 sets the IV estimation execution flag to OFF, sets the basic target output current as the target output current and controls the output current to the basic target output current.

In Step S43, the controller 5 stops the transient-state IV characteristic estimation process by setting the IV estimation execution flag to OFF. Then, the basic target output current is set as the target output current and the output current is controlled to the basic target output current.

In Step S44, the controller 5 sets the interval period $t_{int}$ to zero.

Figure 9:
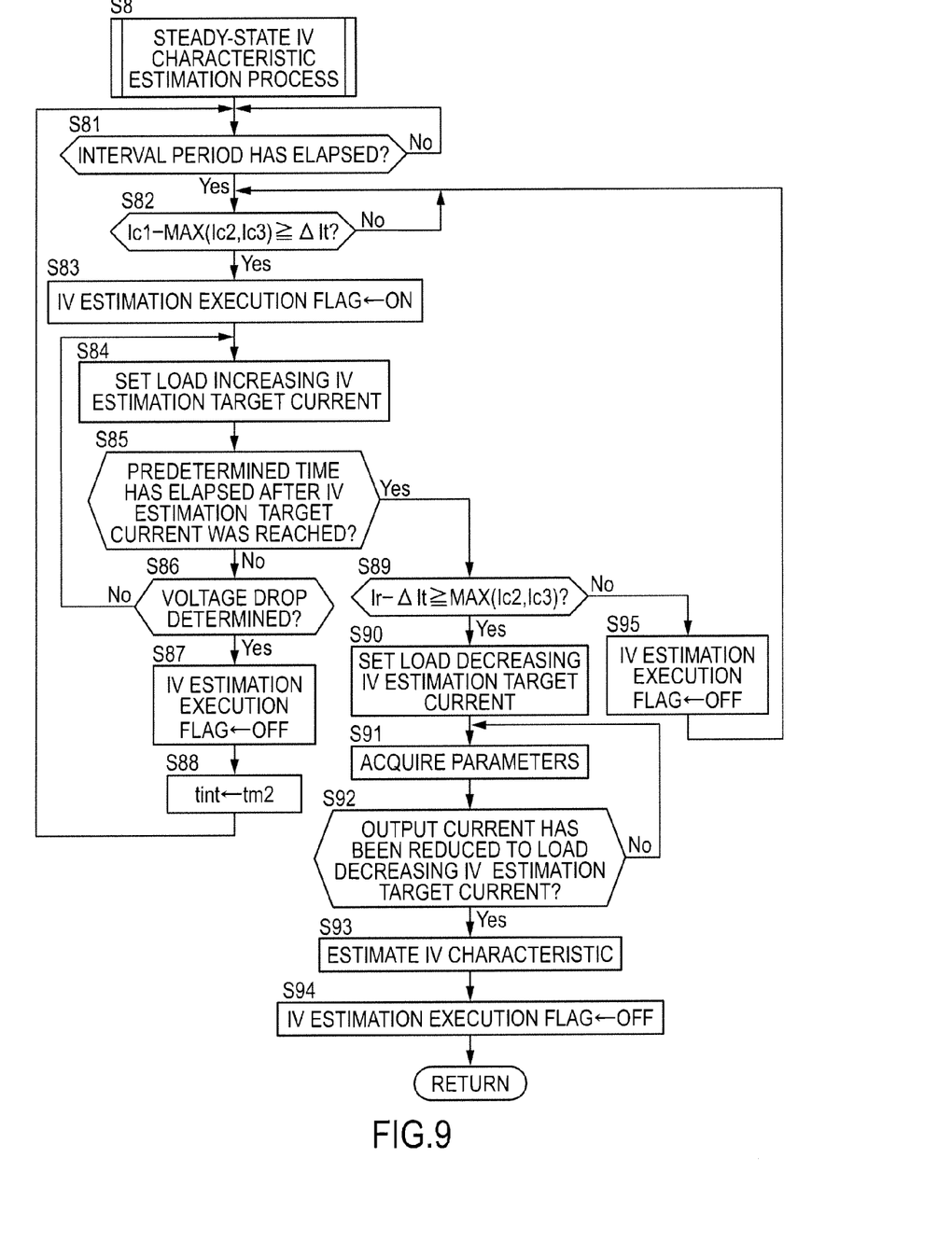
FIG. 9 is a flow chart showing a steady-state IV characteristic estimation process.

FIG. 9 is a flow chart showing the steady-state IV characteristic estimation process.

In Step S81, the controller 5 determines whether or not an elapsed time after the interval period $t_{int}$ was set has become longer than the set interval period $t_{int}$. The controller 5 repeats this processing until the interval period $t_{int}$ elapses and performs a processing of Step S82 upon the elapse of the interval period $t_{int}$.

In Step S82, the controller 5 determines whether or not a difference between the upper limit output current $I_{c1}$ and the larger one of the lower limit output current $I_{c2}$ and the IV estimation lower limit current $I_{c3}$ is not smaller than the current variation width $\Delta I_t$. The controller 5 performs a processing of Step S83 if the difference between the upper limit output current $I_{c1}$ and the larger one of the lower limit output current $I_{c2}$ and the IV estimation lower limit current $I_{c3}$ is not smaller than the current variation width $\Delta I_t$ while continuing this processing until the difference becomes equal to or larger than the current variation width $\Delta I_t$ unless otherwise.

In Step S83, the controller 5 sets the IV estimation execution flag to ON.

In Step S84, the controller 5 sets the smaller one of the upper limit output current $I_{c1}$ when the difference between the upper limit output current $I_{c1}$ and the larger one of the lower limit output current $I_{c2}$ and the IV estimation lower limit current $I_{c3}$ becomes equal to or larger than the current variation width $\Delta I_t$ and the present upper limit output current $I_{c1}$ as a load increasing IV estimation target current.

In Step S85, the controller 5 determines whether or not a predetermined time has elapsed after the output current reached the load increasing IV estimation target current set in Step S84. The controller 5 performs a processing of Step S86 unless the predetermined time has elapsed after the output current reached the load increasing IV estimation target current while performing a processing of Step S89 if the predetermined time has elapsed.

In Step S86, the controller 5 performs a voltage drop determination. Specifically, whether or not the output voltage has dropped below a predetermined voltage drop determination value when the output current is maintained at the load increasing IV estimation target current is determined. The controller 5 performs a processing of Step S87 to perform the steady-state IV characteristic estimation process again after the elapse of a predetermined interval period if the output voltage has dropped below the predetermined voltage drop determination value. On the other hand, a return is made to Step S84 if the output voltage is not smaller than the predetermined voltage drop determination value.

In Step S87, the controller 5 sets the IV estimation execution flag to OFF, sets the basic target output current as the target output current and controls the output current to the basic target output current.

In Step S88, the controller 5 sets the interval period $t_{int}$ to the predetermined fixed value $t_{m2}$ and, thereafter, a return is made to Step S81 to start the IV characteristic estimation process again after the elapse of the set interval period.

In Step S89, the controller 5 determines whether or not a value obtained by subtracting the current variation width $\Delta I_t$ from the present output current $I_r$ is not smaller than the lower limit output current $I_{c2}$ and the IV estimation lower limit current $I_{c3}$. The controller 5 performs a processing of Step S90 if the value obtained by subtracting the current variation width $\Delta I_t$ from the present output current $I_r$ is not smaller than the lower limit output current $I_{c2}$ and the IV estimation lower limit current $I_{c3}$. On the other hand, a processing of Step S95 is performed if the value obtained by subtracting the current variation width $\Delta I_t$ from the present output current $I_r$ is smaller than the lower limit output current $I_{c2}$ and the IV estimation lower limit current $I_{c3}$.

In Step S90, the controller 5 sets the larger one of the value obtained by subtracting the current variation width $\Delta I_t$ from the present output current $I_r$ and the lower limit output current $I_{c2}$ as a load decreasing IV estimation target current and reduces the output current toward the load decreasing IV estimation target current at a predetermined change rate.

In Step S91, the controller 5 acquires data on the reference voltages and the actual output voltages while reducing the output current.

In Step S92, the controller 5 determines whether or not the output current has been reduced to the load decreasing IV estimation target current set in Step S89. The controller 5 performs a processing of Step S93 if the output current has been reduced to the load decreasing IV estimation target current while returning to the processing of Step S91 to acquire data unless otherwise.

In Step S93, the controller 5 finishes the acquisition of the data on the reference voltages and the actual output voltages and estimates the IV characteristic.

In Step S94, the controller 5 sets the IV estimation execution flag to OFF, sets the basic target output current as the target output current and controls the output current to the basic target output current.

In Step S95, the controller 5 sets the IV estimation execution flag to OFF. Then, the basic target output current is set as the target output current, the output current is controlled to the basic target output current and a return is made to Step S82 to start the IV characteristic estimation process again.

As described above, according to the present embodiment, the IV characteristic of the fuel cell stack 1 is estimated on the basis of the data acquired at an arbitrary output current value (reference voltage and the actual output voltage) while the output current of the fuel cell stack 1 is reduced.

Thus, water and ice are not suddenly increased unlike in the case of estimating the IV characteristic by increasing the output current of the fuel cell stack 1, wherefore the occurrence of a voltage drop caused by this can be suppressed. Further, since there is no concern about the occurrence of a voltage drop, the current can be quickly reduced. Therefore, a change of the IV characteristic during the acquisition of the data necessary for IV estimation can be small and the estimation accuracy of the IV characteristic can be ensured.

Further, the IV characteristic estimated on the basis of the data acquired while reducing the output current of the fuel cell stack 1 becomes an IV characteristic worse than the actual IV characteristic when the data acquisition is finished. By issuing the vehicle travel permit on the basis of the IV characteristic worse than the actual IV characteristic, a drop of the output voltage below the minimum voltage can be suppressed even if the output current is increased by vehicle travel.

Further, according to the present embodiment, the fuel cell stack 1 is caused to generate power to promote the warm-up in a state where self-heat generation is actively used by basically setting the target value of the generated power at the warm-up target consumption power and maximizing the consumption power of each auxiliary machine such as the cathode compressor 23 during the warm-up of the fuel cell stack 1. In estimating the IV characteristic, the generated power is made larger than the warm-up target consumption power by supplying a part of the generated power of the fuel cell stack 1 to the battery 45, the output current is reduced after the output current is increased and the IV characteristic of the fuel cell stack 1 is estimated on the basis of the data acquired when the output current is reduced.

To promote the warm-up of the fuel cell stack 1, it is desirable to cause the fuel cell stack 1 to generate power in a state where the consumption power of each auxiliary machine is maximized and the self-heat generation is actively used. However, if the consumption power of each auxiliary machine (power supplied to each auxiliary machine) is reduced to reduce the output current in order to estimate the IV characteristic, warm-up performance is deteriorated since the amount of self-heat generation is reduced.

Accordingly, by supplying the generated power of the fuel cell stack 1 to the battery 45 with the consumption power of each auxiliary machine maximized and reducing the output current after the output current is increased as in the present embodiment, it is possible to estimate the IV characteristic while suppressing the deterioration of warm-up performance.

Further, according to the present embodiment, the IV characteristic is estimated in the transient state before the auxiliary machine consumption power reaches the warm-up target consumption power after the start-up of the fuel cell stack 100.

In this way, the IV characteristic can be estimated earlier as compared with the case where the IV characteristic is estimated in the steady state after the auxiliary machine consumption power reaches the warm-up target consumption power.

Further, since the lower limit output current also increases with an increase in the auxiliary machine consumption power while the output current is reduced when it is attempted to estimate the IV characteristic by acquiring predetermined data while reducing the output current in such a transient state, the accuracy of the IV characteristic may be reduced without being able to ensure the predetermined current variation width $\Delta I_t$.

Contrary to this, in the present embodiment, the steady-state lower limit current $I_{t1}$, i.e. the minimum value of the output current extractable in the steady state after the auxiliary machine consumption power reaches the warm-up target consumption power is calculated, and the IV estimation was carried out on the basis of this steady-state lower limit current $I_{t1}$ when the predetermined current variation width $\Delta I_t$ can be ensured. The steady-state lower limit current $I_{t1}$ can be also called as a maximum value of the lower limit output current in the transient state. Thus, by carrying out the IV estimation on the basis of the steady-state lower limit current $I_{t1}$ when the predetermined current variation width $\Delta I_t$ can be ensured, the output current can be reliably reduced by the current variation width $\Delta I_t$, wherefore the accuracy of the IV characteristic can be ensured.

As just described, according to the present embodiment, the accuracy of the IV characteristic can be ensured also in the transient state. Thus, the vehicle travel permit can be quickly issued such as when the IV characteristic is suddenly recovered during warm-up.

Further, according to the present embodiment, the upper limit output current $I_{c1}$ and the steady-state lower limit current $I_{t1}$ can be calculated according to a state of the battery such as the battery charge amount, wherefore the over-charge and over-discharge of the battery 45 can be prevented and the deterioration of the battery 45 can be prevented.

Although the embodiment of the present invention has been described above, the above embodiment is merely an illustration of one application example of the present invention and not of the nature to limit the technical scope of the present invention to the specific configuration of the above embodiment.

For example, in the above embodiment, the IV estimation is started by controlling the output current to the load increasing target current $I_{t2}$ in order to reliably ensure the current variation width $\Delta I_t$ when the difference between the upper limit output current $I_{c1}$ and the steady-state lower limit current $I_{t1}$ becomes equal to or larger than the predetermined current variation width $\Delta I_t$. However, the IV estimation may be started by increasing the output current as long as it is already determined that the output current has reached the steady-state lower limit current $I_{t1}$. Effects similar to those of the above embodiment can be obtained also by this.

The present application claims a priority of Japanese Patent Application No. 2013-85941 filed with the Japan Patent Office on Apr. 16, 2013, and all the contents of which are hereby incorporated by reference.

The invention claimed is:

1. A fuel cell system for generating power by supplying anode gas and cathode gas to a fuel cell, comprising:
   an auxiliary machine to be connected to the fuel cell; and
   a controller programmed to:
   control generated power of the fuel cell by adjusting power supplied to the auxiliary machine during a warm-up of the fuel cell based on self-heat generation thereof;
   temporarily reduce the power supplied to the auxiliary machine during the warm-up to obtain at least two pairs of current values and voltage values; and
   estimate a current-voltage (IV) characteristic of the fuel cell on the basis of the at least two pairs of current values and voltage values.

2. The fuel cell system according to claim 1, wherein:
   the auxiliary machine includes a battery for storing surplus power of the fuel cell and an electrical component to be driven when the fuel cell generates power; and
   the controller is further programmed to reduce an output current of the fuel cell after the output current is increased by the supply of power to the battery and estimates the IV characteristic of the fuel cell on the basis of the at least two pairs of current values and voltage values when reducing the output current, during the warm-up in which the generated power of the fuel cell is so controlled that the output current of the fuel cell reaches a predetermined warm-up target output current by adjusting consumption power of the electrical component by the controller.

3. The fuel cell system according to claim 2, wherein:
the controller is further programmed to increase the output current of the fuel cell by starting the supply of power to the battery when a difference between an upper limit output current obtained by adding a chargeable current of the battery to the output current of the fuel cell and a steady-state lower limit output current obtained by subtracting a dischargeable current of the battery from the warm-up target output current becomes equal to or larger than a predetermined value in a transient state where the output current of the fuel cell is gradually increased toward the warm-up target output current.

4. The fuel cell system according to claim 2, wherein:
the controller is further programmed to increase the output current of the fuel cell by starting the supply of power to the battery when the output current of the fuel cell becomes equal to or larger than a steady-state lower limit output current obtained by subtracting a dischargeable current of the battery from the warm-up target output current in a transient state where the output current of the fuel cell is gradually increased toward the warm-up target output current.

5. A control method for a fuel cell system configured to generate power by supplying anode gas and cathode gas to a fuel cell and including an auxiliary machine to be connected to the fuel cell, the control method comprising:
controlling generated power of the fuel cell by adjusting power supplied to the auxiliary machine during a warm-up of the fuel cell based on self-heat generation thereof;
temporarily reducing the power supplied to the auxiliary machine to obtain at least two pairs of current values and voltage values; and
estimating a current-voltage (IV) characteristic of the fuel cell on the basis of the at least two pairs of current values and voltage values.

6. A fuel cell system for generating power by supplying anode gas and cathode gas to a fuel cell, comprising:
an auxiliary machine to be connected to the fuel cell;
warm-up power control means for controlling generated power of the fuel cell by adjusting power supplied to the auxiliary machine during a warm-up of the fuel cell based on self-heat generation thereof; and
IV characteristic estimation means for temporarily reducing the power supplied to the auxiliary machine to obtain at least two pairs of current values and voltage values and estimating a current-voltage (IV) characteristic of the fuel cell on the basis of the at least two pairs of current values and voltage values.

7. The fuel cell system according to claim 1, wherein the controller is further programmed to temporarily reduce the power supplied to the auxiliary machine and then obtain the at least two pairs of current values and voltage values.

8. The control method according to claim 5, wherein the power supplied to the auxiliary machine is temporarily reduced and then the at least two pairs of current values and voltage values are obtained.

9. The fuel cell system according to claim 6, wherein the warm-up power control means temporarily reduces the power supplied to the auxiliary machine and then obtains the at least two pairs of current values and voltage values.

* * * * *